Sept. 2, 1952  W. R. FRANK  2,608,813
OFFSET DISK HARROW LINKS
Filed Feb. 2, 1948  2 SHEETS—SHEET 1

INVENTOR.
WILLIAM R. FRANK
BY
C. T. Parker R. J. Johnson
ATTORNEYS

*INVENTOR.*
WILLIAM R. FRANK

BY
*ATTORNEYS*

Patented Sept. 2, 1952

2,608,813

UNITED STATES PATENT OFFICE 2,608,813

OFFSET DISK HARROW LINKS

William R. Frank, Bell, Calif., assignor to John Deere Killefer Company, Los Angeles, Calif., a corporation of California Application February 2, 1948, Serial No. 5,785

2 Claims. (Cl. 55—83)

The present invention relates generally to agricultural implements and more particularly to disk harrows, with particular reference to disk harrows of the offset type, and has for its principal object the provision of a novel and improved harrow which is simple and efficient but strong and durable in operation.

A further object of this invention relates to the provision of new and improved linkage connecting the front and rear gangs for anchoring movement in a generally horizontal direction, said linkage being especially constructed and arranged to resist those forces which, due to the soil pressure acting against the disks of the front and rear gangs, tend to cause one end of one gang to run deeper and the adjacent end of the other gang to run more shallow. Further, in this connection it is another feature of this invention to provide interconnecting linkage between the gangs which includes compression and tension members hingedly connected with the gang frames in order to hold the gangs level in operation and to resist the tendency of one gang to tilt relative to the other gang.

A further important feature of the present invention relates to the provision of interconnecting linkage between the front and rear gangs of an offset disk harrow, the linkage including rigid generally U-shaped bars hingedly connected with the gangs for movement about relatively vertical axes, with means connecting the end portions of the U-shaped members for adjusting the position of one gang relative to the other in a generally vertical direction thus providing for leveling the gangs.

A further object of my invention relates to the provision of a novel and improved means for connecting a fluid pressure actuated power unit, such as a hydraulic cylinder and piston assembly, between the front and rear gangs which are interconnected together for movement in a horozontal plane by rigid link means which are so constructed and arranged as to prevent any undesired vertical displacement of either end of either gang relative to the other gang.

These and other objects and advantages of my invention will be apparent to those skilled in the art after a consideration of the following detailed description, taken in conjunction with the accompanying drawings, in which.

Figure 1:
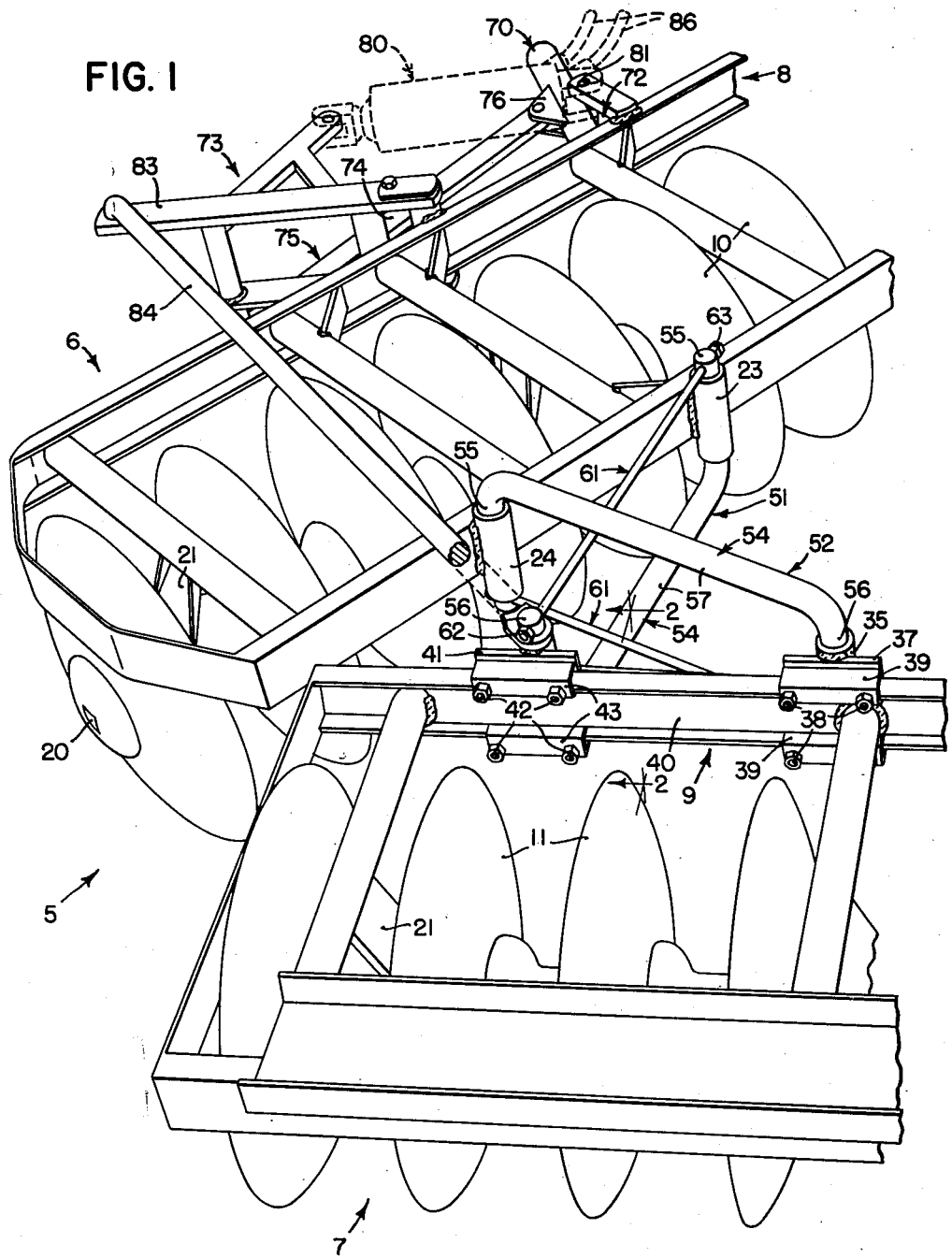
Figure 1 is a perspective view showing one form of offset disk harrow in which the principles of the present invention have been incorporated.
Figure 2:
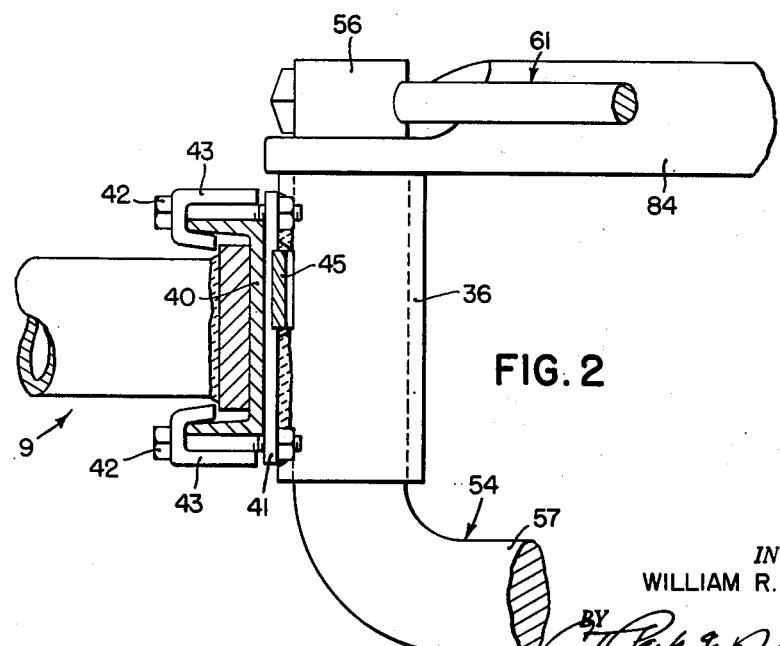
Figure 2 is a fragmentary sectional view taken generally along the line 2—2 of Figure 1, illustrating the pintle and bearing sleeve construction, with associated parts, whereby rigidity against vertical displacement between the gangs is attained, this figure also showing the connection between the rear end of the angling link and the rear gang.

Referring now to the drawings, particularly Figures 1 and 2, the offset disk harrow in which the principles of the present invention have been incorporated is indicated in its entirety by the reference number 5 and comprises a front gang 6 and a rear gang 7, each of the gangs including a horizontally disposed structural frame 8, 9, within which is mounted a series of soil working disks 10, 11. If desired, the front and rear gangs 6 and 7 may be substantially identical, but the front gang is arranged with its disks facing in one direction while the rear gang 7 is arranged with its disks facing in the other direction. In each gang, the disks are mounted on a gang bolt 20 and revolve as a unit, the gang bolt 20 of each gang being supported in vertical depending brackets 21 carried by the end members of the gang frame.

The front and rear gangs 6 and 7 are interconnected by linkage which, according to the principles of the present invention, is so constructed and arranged as to accommodate the movement of one disk gang relative to the other in a generally horizontal direction but movement of either disk gang relative to the other in any other direction, particularly vertically, is resisted. According to the present invention, the rear member of the front gang frame 8 carries a pair of generally vertically disposed bearing sleeve sections 23 and 24 fixed to the rear member of the front gang frame in laterally spaced relation. Preferably, but not necessarily, the bearing sleeve sections 23 and 24 are welded to the rear member of the front gang frame 8.

A pair of similar vertically disposed bearing sleeve sections 35 and 36 are connected in laterally spaced relation to the front member of the rear gang frame 7. The bearing sleeve section 35 is fixed on a plate 37 that is disposed vertically in front of the forward frame member of the rear gang frame 7 and is secured thereto by means of pairs of upper and lower bolts 38 which extend through openings in the plate 37, above and below the front member 40 of the rear gang frame, the rear ends of the bolts 38 extending through openings in associated flanged slidable connectors 39, the flanges of which engage over the edges of the front frame member, which preferably is of channel cross section. The other rear vertically disposed bearing sleeve section 36 is welded to a plate 41 which is preferably identical with the plate 37, being apertured to receive clamping bolts 42 which extend rearwardly above and below the front frame member of the rear gang frame and through openings in slidable flanged connectors 43 which engage over the edges of the frame member. By loosening the bolts 38 and 42 the plates 37 and 41, together with associated bearing sleeve sections 35 and 36, may be adjusted along the front member of the rear gang frame 7, as desired. By adjusting both plates laterally in the same direction along the rear gang frame, the rear disks may be adjusted relative to the ridges and furrows left by the front disks, and by adjusting one of the plates 37 and 41 relative to the other the angle between the gangs in the position of maximum angle may be adjusted. In order to provide a limit for the maximum angle to which the gangs may be swung while in working position, a pair of overlapping straps 45 and 46 are provided, the strap 45 being fixed to the plate 37 and the strap 46 being fixed to the plate 41. Abutment of the outer ends of the strap members with the opposite bearing sleeve section or a portion of the opposite plate serves to limit the minimum distance between the plates 37 and 41.

A pair of crossed link members 51 and 52 serve to rigidly interconnect the front and rear gang frames 8 and 9 so as to accommodate horizontal movement of one gang relative to the other. Each of these link members is substantially identical with the other, and hence a detailed description of one will suffice. The link member 51 comprises a generally U-shaped rigid bar 54 having vertically disposed pintle sections 55 and 56 and an intermediate section 57 connecting the pintle sections. The forward or pintle section 55 is disposed for rocking movement about a vertical axis in the bearing sleeve 23 on the front gang 6 and the rear pintle section 56 is disposed for rocking movement in the vertical bearing sleeve section 36 on the rear gang frame 9. In addition to the rigid U-shaped bar 54, the link member 51 includes a tension member 61 extending through openings in the outer ends of the associated pintle sections 55 and 56. One end of the tension member 61 carries a head 62 while the other end is threaded and carries an adjusting nut 63.

The other link member 52 is constructed as just described for the link member 51, the link member 52 having its forward pintle section 55 disposed in the bearing sleeve section 23 and its rear pintle section 56 disposed in the bearing sleeve section 35, the link member 51 having its pintle sections extending upwardly while the link member 52 has its pintle sections extending downwardly so as to provide adequate clearance between the intermediate sections 57 of the rigid U-shaped bars 54. The disposition of the tension link sections 61 connecting the outer ends of the pintle sections provides the necessary clearance between the tension sections 62 and the intermediate portions 54 of the rigid members, due to the bend or curved portion between the pintle sections and the central or intermediate portions of the rigid bars.

A hitch member 70 is pivotally connected at its rear end to a bracket 72 fixed to the front frame member of the front gang frame 6. A bell crank 73 is pivotally connected to a bracket 74 also fixed to the front frame member of the front gang frame 8. One arm of the bell crank receives one end of a transverse extensible draft member 75, the other end being pivotally connected to a bracket 76 carried by the hitch member 70. A power unit 80 in the form of a cylinder and piston assembly is pivotally connected, as at 81, to the bracket 72 and the piston portion of the unit 80 is pivotally connected to the bell crank 73 whereby extension and retraction of the unit 80 serves to swing the bell crank 73. An arm 83 on the latter is pivotally connected to the front end of an angling link 84, the rear end of which, in one form of the present invention, is apertured and receives the upper end of the rear pintle section 56 of the link member 51. Power is delivered to the unit 80 through a pair of hose lines 86. The latter are flexible and extend to hydraulic control mechanism (not shown) on the tractor to which the forward end of the hitch member 70 is connected. When the unit 80 is retracted, a pull is exerted through the angling link 84, and, acting against the front gang 6, the forces exerted by the unit 80 swing the gangs 6 and 7 into an angled or working position. Extension of the unit 80 swings the gangs 6 and 7 in the other direction into a parallel or transport position.

When the gangs are in their angled or working position the soil pressure against the concave sides of the disks of one gang tend to cause that gang to tilt so that one end tends to run too deep and the other end tends to run out of the ground. Conversely, the soil pressure acting against the disks of the other gang, in which the disks face in the opposite direction, tends to cause the other gang to tilt in the other direction. However, the rigid crossed link members 51 and 52 effectively resist any vertical displacement of either end of either of the gangs although providing for free swinging action in a horizontal action, under the control of the power unit 80. The link members 51 and 52 are so arranged that the rigid U-shaped bars are subjected primarily to compression stresses while the associated tension sections 61 are subjected primarily only to tensile stresses. This provides a very rigid interconnecting linkage between the gangs which effectively hold them in a common horizontal plane yet without the heavy cumbersome parts heretofore found necessary. Further, adjusting the tension links 61 that extend between the vertical pintle sections of the rigid U-shaped bars serves to bring the gangs to a level or horizontal position and thus accommodates not only for slight manufacturing tolerances but also for any wear that may occur between the pintle sections and the associated bearing sleeve sections.

Figure 3:
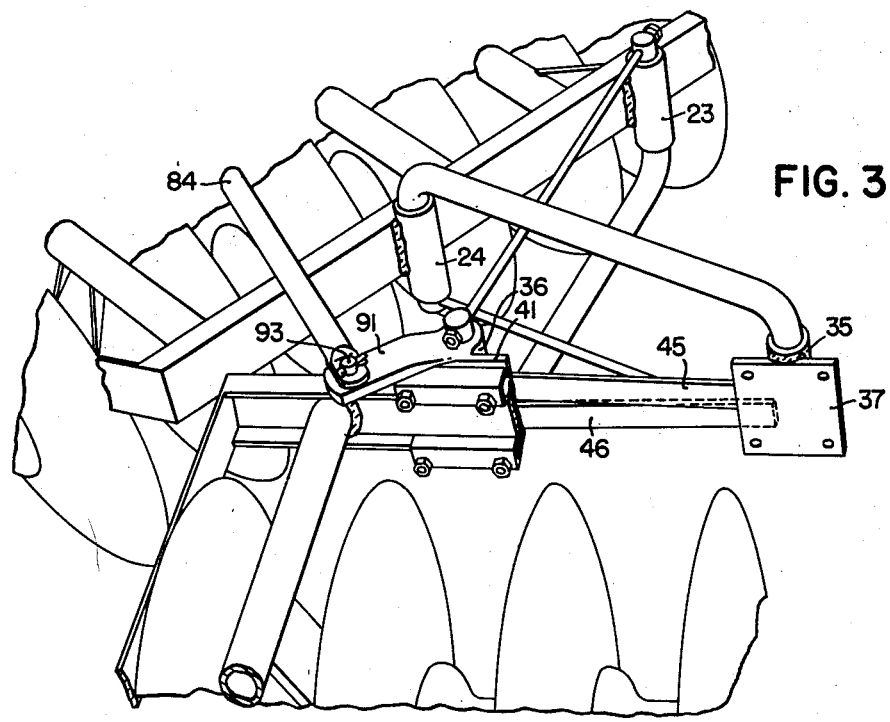
Figure 3 is a modified form of connection between the angling link and the rear gang.

Referring now to Figure 3, under certain conditions it may not be desirable to connect the angling link 84 directly to the outer end of the associated pintle section 56 but to connect the link to the rear gang at a point laterally inwardly thereof. In that case I prefer to weld or otherwise fix a bracket 91 to the associated plate 41 or the upper end of the associated bearing sleeve section 36, the bracket carrying a stud 93 which connects the rear end of the link 84 to the rear gang frame. If desired, however, the outer end of the bracket 91 may be apertured and the rear end of the angle link 84 turned downwardly to connect into the bracket aperture, in substantially the same way that the forward end of the link 84 is connected pivotally to the bell crank arm 83 in Figure 1.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefor, and desire to secure by Letters Patent is:

1. An offset disk harrow comprising a pair of tandem disk gangs, each gang including a generally horizontal frame, said gangs being normally disposed in oppositely angled relation and with the disks of one gang facing in one direction and the disks of the other gang facing in the generally opposite direction, whereby in operation one gang tends to tilt in one direction and the other gang tends to tilt in the other direction, and connecting linkage acting between said gangs so as to hold said gang frames substantially in the same generally horizontal plane comprising a pair of cross link members pivotally connected at their opposite ends to said gangs at laterally spaced points, each of said link members comprising a generally U-shaped rigid bar having generally vertically disposed pintle sections, and bearing sleeve members on said gang frames for receiving said pintle sections, one of said U-shaped bars being arranged so that its central portion lies in an upper position with the pintle sections extending downwardly therefrom and the other of said bars being arranged so that its central portion lies in a lower position with its pintle sections extending upwardly therefrom, whereby said rigid bars may cross with clearance between their central portions while said sleeve members may be connected to said gang frames in substantially the same vertical relation with respect to said frames.

2. An offset disk harrow comprising a pair of tandem disk gangs, and a pair of crossed link members pivotally connected at their opposite ends to said gangs at laterally spaced points, each of said link members comprising a generally U-shaped rigid bar having generally vertically disposed pintle sections and a central section joined to said pintle section by a curved portion, bearing sleeve members on said gangs for receiving said pintle sections, and a tension link connecting the outer ends of the pintle sections of each link member and lying in a plane closely adjacent the plane of the adjacent ends of the bearing sleeve members, one of said U-shaped bars being arranged so that its central portion lies in an upper position with the pintle sections extending downwardly therefrom and the other of said bars being arranged so that its central portion lies in a lower position with its pintle sections extending upwardly therefrom whereby in operation the central portion of each bar will be stressed in compression and each link will be stressed in tension, said sleeve member being connected to said gang frames in substantially the same vertical relation with respect to said frames and each tension link lying generally in the space between the plane of the adjacent ends of the bearing sleeve members and the central section of the associated U-shaped bar.

WILLIAM R. FRANK.

REFERENCES CITED

The following references are of record in the file of this patent:

UNITED STATES PATENTS

| Number | Name | Date |
| --- | --- | --- |
| 203,048 | Johnson | Apr. 30, 1878 |
| 1,769,123 | Dwyer | July 1, 1930 |
| 1,912,125 | Brown | May 30, 1933 |
| 1,967,493 | Boda | July 24, 1934 |